US009404323B2

(12) United States Patent
Swanson et al.

(10) Patent No.: US 9,404,323 B2
(45) Date of Patent: Aug. 2, 2016

(54) EMERGENCY CYLINDER LOWERING CIRCUIT WITH REGENERATIVE HYDRAULICS AND BURST PROTECTION

(71) Applicant: Forum US, Inc., Houston, TX (US)

(72) Inventors: Gregory David Swanson, Magnolia, TX (US); Joshua Brandon Meuth, Giddings, TX (US)

(73) Assignee: FORUM US, INC., Houston, TX (US)

( * ) Notice: Subject to any disclaimer, the term of this patent is extended or adjusted under 35 U.S.C. 154(b) by 322 days.

(21) Appl. No.: 14/207,164

(22) Filed: Mar. 12, 2014

(65) Prior Publication Data

US 2014/0260235 A1 Sep. 18, 2014

Related U.S. Application Data

(60) Provisional application No. 61/780,610, filed on Mar. 13, 2013.

(51) Int. Cl.

| | |
|---|---|
| ***F16D 31/02*** | (2006.01) |
| ***E21B 19/15*** | (2006.01) |
| ***F15B 20/00*** | (2006.01) |
| *F15B 13/00* | (2006.01) |

(52) U.S. Cl.
CPC ................ *E21B 19/15* (2013.01); *F15B 20/00* (2013.01); *F15B 2013/004* (2013.01); *Y10T 137/7838* (2015.04)

(58) Field of Classification Search
CPC .. F15B 2013/004; F15B 20/00; F15B 20/004; F15B 20/005
USPC ........................................................... 60/403
See application file for complete search history.

(56) References Cited

U.S. PATENT DOCUMENTS

| | | | |
|---|---|---|---|
| 1,509,508 | A | 9/1924 | Grunwald et al. |
| 3,801,151 | A | 4/1974 | Reynolds et al. |
| 4,520,625 | A | 6/1985 | Sato et al. |
| 5,381,822 | A | 1/1995 | Christensen |

OTHER PUBLICATIONS

PCT International Search Report and Written Opinion for Application PCT/US2014/025836, dated Jul. 17, 2014.

*Primary Examiner* — Michael Leslie
(74) *Attorney, Agent, or Firm* — Patterson & Sheridan, L.L.P.

(57) ABSTRACT

A safety system for bypassing counter balance valves of a catwalk hydraulic cylinder from a remote location in a safe and controlled manner. Oil from a base end of the hydraulic cylinder is routed around the counter balance valves and flows through a velocity fuse to a needle valve, a check valve, and a pump outlet.

9 Claims, 10 Drawing Sheets

EMERGENCY CYLINDER LOWERING CIRCUIT WITH REGENERATIVE HYDRAULICS AND BURST PROTECTION

CROSS REFERENCE TO RELATED APPLICATIONS

This application claims benefit of U.S. Provisional Patent Application No. 61/780,610, filed Mar. 13, 2013, the contents of which are herein incorporated by reference in their entirety.

BACKGROUND OF THE INVENTION

1. Field of the Invention

Embodiments of the invention generally relate to catwalks for conveying pipe to a drill floor from a lower section of a drilling rig or drill site. Specifically, embodiments of the invention relate to an emergency cylinder lowering circuit which allows the catwalk trough to be lowered remotely to its home position in a safe manner in the event of a hydraulic failure.

2. Description of the Related Art

In a drilling operation or rig work-over operation, whether on a water-based or land-based drilling rig, pipe for the drilling operation, casing, or other tubulars are often stored at or supplied from a level that is lower than the drill floor. Operators typically use a "catwalk" to convey the pipe from the lower level to the drill floor. The pipe is typically mechanically transported (e.g. pushed by a skate and/or pulled in catwalk in a v-shaped trough) from a level below the rig floor to the rig floor.

In prior art catwalks, the trough is raised using hydraulic cylinders which raise a leg of the catwalk. Prior art hydraulic cylinders used with catwalks have counter balance valves, one on each end of the cylinder, that maintain pressure within the cylinder in the event that a hose breaks or the hydraulic power unit (HPU) fails. As a result, the counter balance valves prevent the cylinders, and the catwalk, from moving up or down. In order to lower the catwalk, current systems require the counter balance valves to be manually opened so that the hydraulic fluid can flow to the rod end and the tank and the hydraulic cylinders can retract to their home position.

Accordingly, it would be useful to have a system that allows catwalk users to control the routing of hydraulic fluid from a remote location so that the catwalk can be slowly and safely returned to its home position.

SUMMARY OF THE INVENTION

Embodiments of the invention provide a safety system for bypassing counter balance valves for a catwalk hydraulic cylinder from a remote location in a safe and controlled manner.

BRIEF DESCRIPTION OF THE DRAWINGS

So that the manner in which the above recited aspects of the invention can be understood in detail, a more particular description of embodiments of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
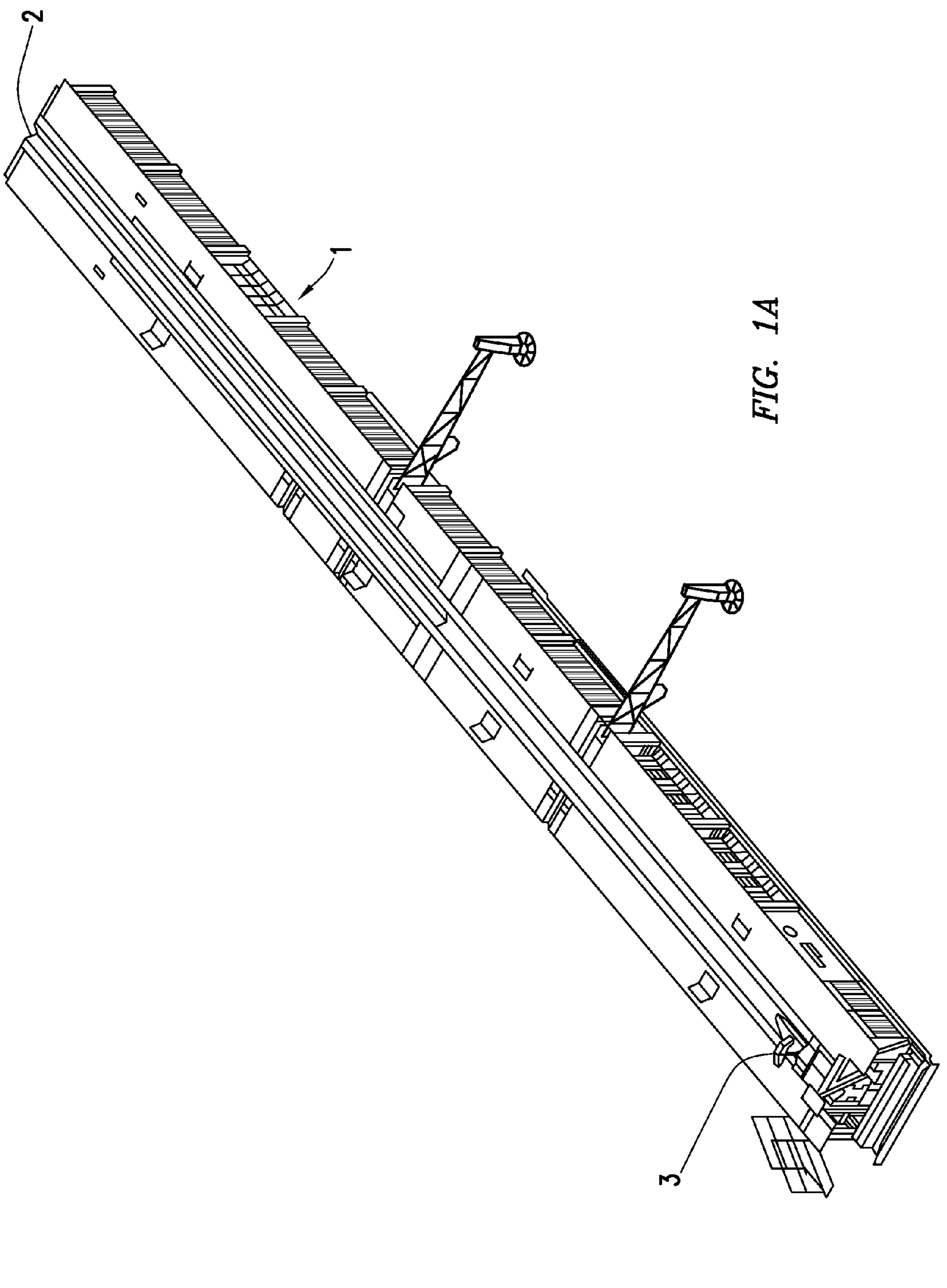
FIG. 1A shows a catwalk in the position in which pipe is loaded onto the catwalk or unloaded from the catwalk.
Figure 1B:
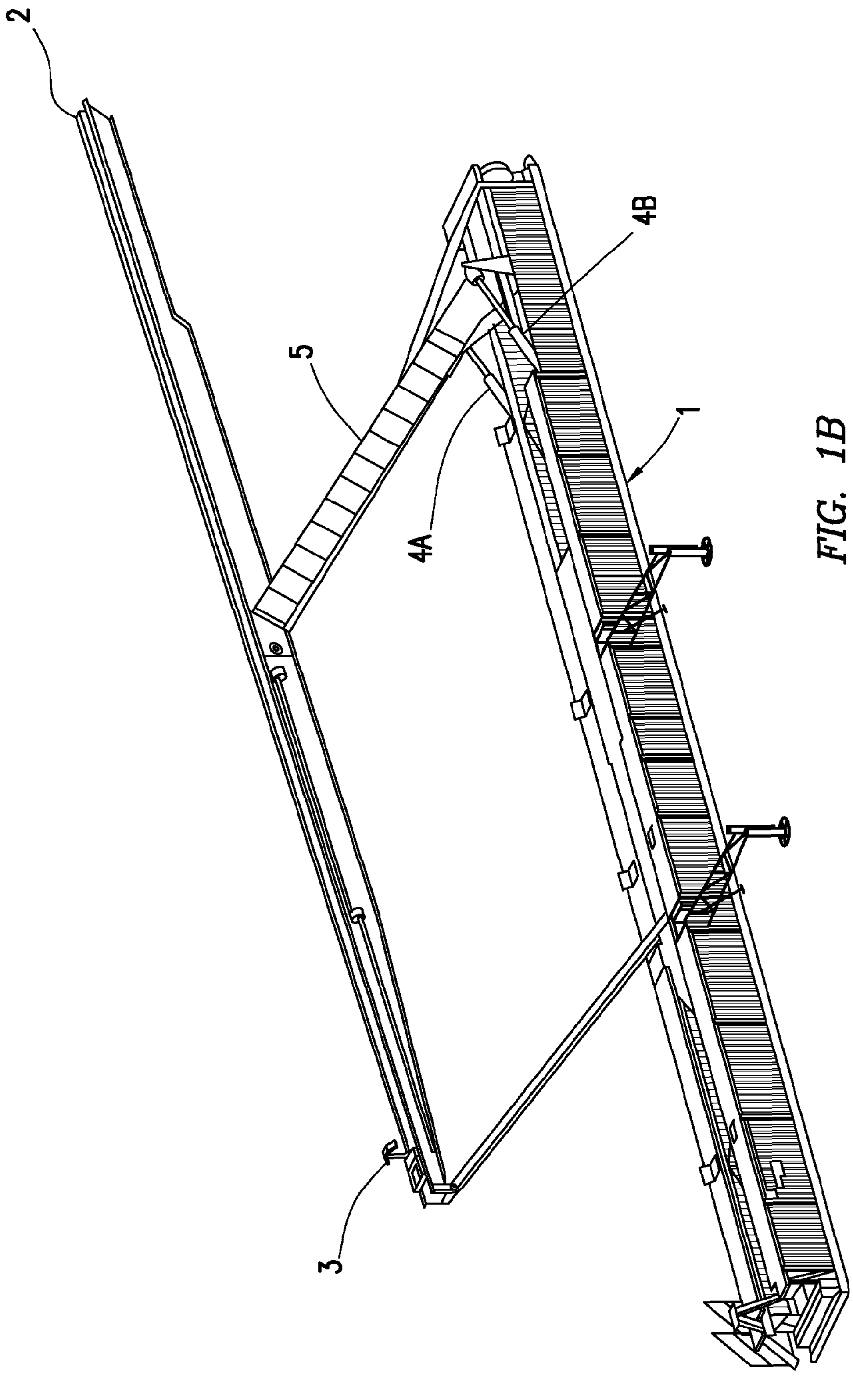
FIG. 1B shows the catwalk in an elevated position in which the hydraulic cylinders that raise and lower the catwalk are extended and pipe is being conveyed to or from the drill floor.

FIG. 1A shows a catwalk 1 in the position in which tubulars are loaded onto a trough 2 of the catwalk 1. The tubulars are moved along the trough 2 by a skate 3. FIG. 1B shows the trough 2 in the process of being raised to the drill floor. The trough 2 is raised from the position shown in FIG. 1A to the positions shown in FIGS. 1B and 1C using hydraulic cylinders 4A, 4B, which raise leg 5 of the catwalk 1.

Figure 1C:
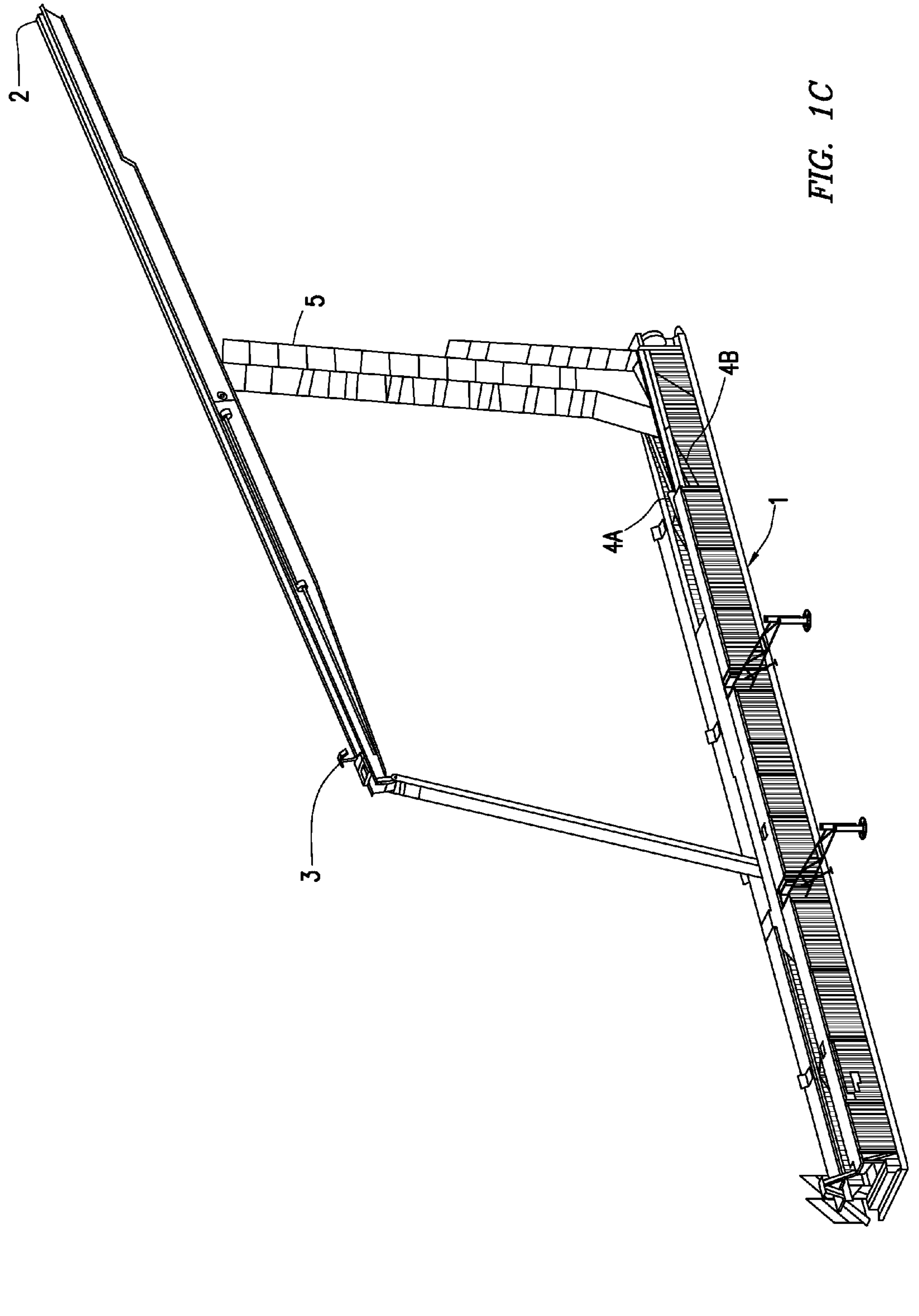
FIG. 1C shows the hydraulic cylinders fully extended so that pipe or other tubulars can be conveyed to a drill floor.
Figure 2:
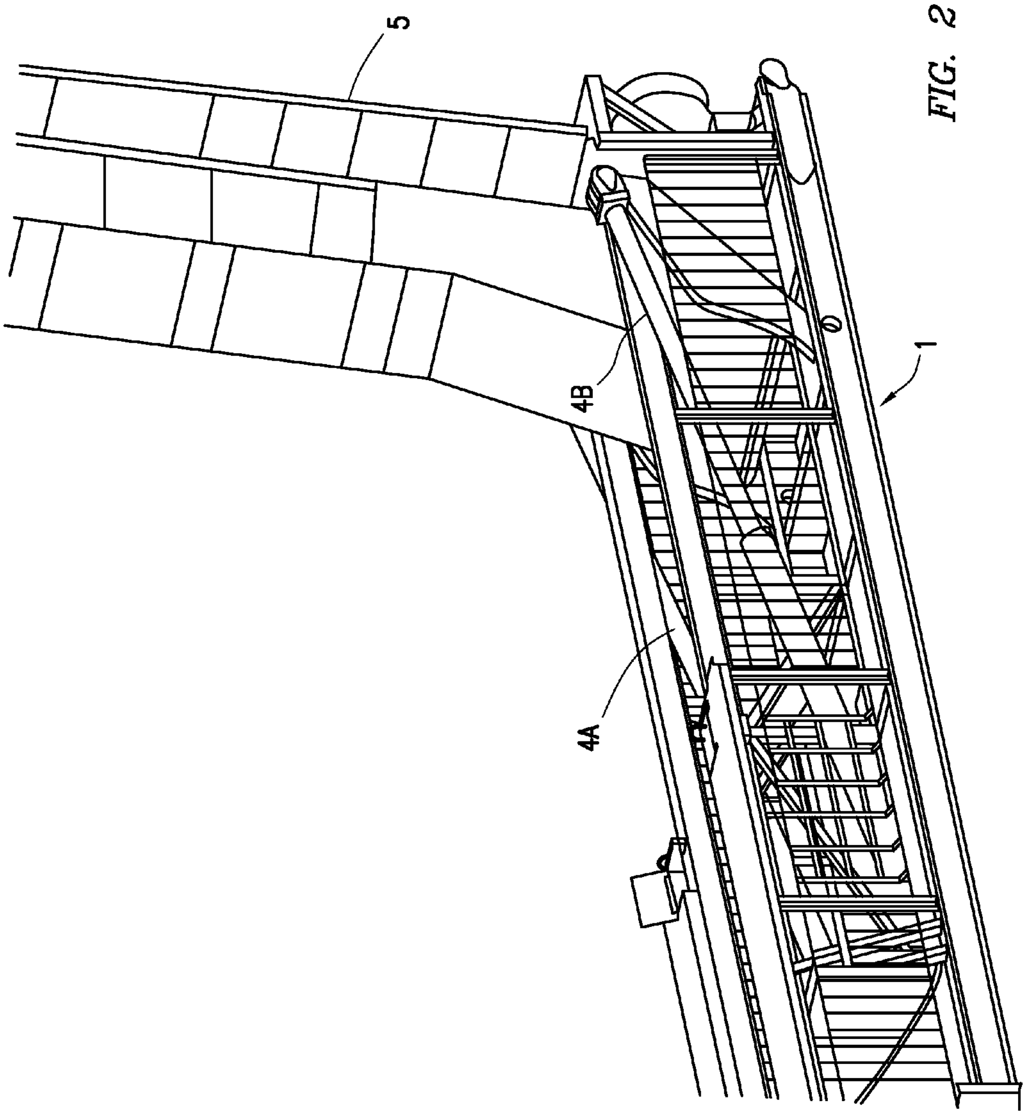
FIG. 2 shows a detailed view of FIG. 1C in which the hydraulic cylinders are fully extended so that a leg of the catwalk has raised one end of the trough adjacent to the drill floor.

FIG. 2 is an enlarged, detailed view of FIG. 1C. FIG. 2 illustrates the hydraulic cylinders 4A, 4B raising the leg 5 to a substantially vertical position. Embodiments of the invention are used when, for example, there is a hydraulic failure and the hydraulic cylinders 4A, 4B have locked the trough 2 in the positions shown in FIGS. 1B or 1C.

Figure 6:
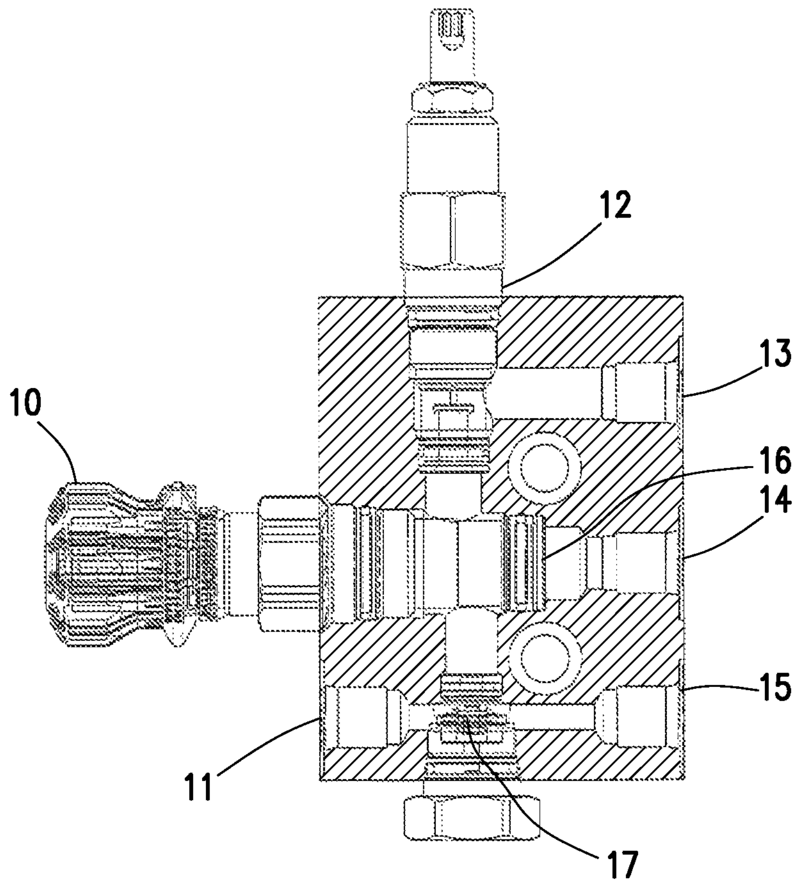
FIG. 6 is a cut-away of the safety valve package, showing the needle valve, the relief valve, the check valve, and the pump connection.

The embodiments of the invention described herein are configured to route oil from the base end of hydraulic cylinders 4A, 4B around one or more counter balance valves and through one or more velocity fuses. The oil flows from the velocity fuse through a needle valve (e.g. needle valve 16 as shown in FIG. 6) and then flows through a check valve (e.g. check valve 17 as shown in FIG. 6) to a tee connected to the rod end of the cylinder 4A, 4B (e.g. via rod end connection 15 as shown in FIG. 6) and a pump outlet port (e.g. pump connection 11 as shown in FIG. 6). The check valve prevents pressure from the pump from causing the cylinder 4A, 4B to extend (e.g. via cap end connection 14 as shown in FIG. 6). In the event that the cylinder 4A, 4B is over center so that gravity cannot be used to lower the catwalk 1, a manual or air actuated pump can be used to pump fluid into the rod end of the cylinder 4A, 4B (e.g. via pump connection 11 and rod end connection 15 as shown in FIG. 6). Once the weight on the cylinder 4A, 4B becomes positive on the base end of the cylinder, the oil is allowed to pass from the base end of the cylinder 4A, 4B to the rod end and the hydraulic cylinders 4A, 4B safely lower the catwalk 1 to its home position. Excess oil that comes from the base end of the cylinder 4A, 4B that is not used to fill the rod end of the cylinder 4A, 4B is routed through a relief valve (e.g. relieve valve 12 as shown in FIG. 6) back to a hydraulic fluid tank (e.g. via connection 13 as shown in FIG. 6). In the event that a hose ruptures or one of the fittings in the fluid circuit is damaged in such a manner as to cause the cylinder 4A, 4B to fall rapidly, the velocity fuse will close, thereby arresting the descent of the main arm and thus the catwalk 1.

Figure 3A:
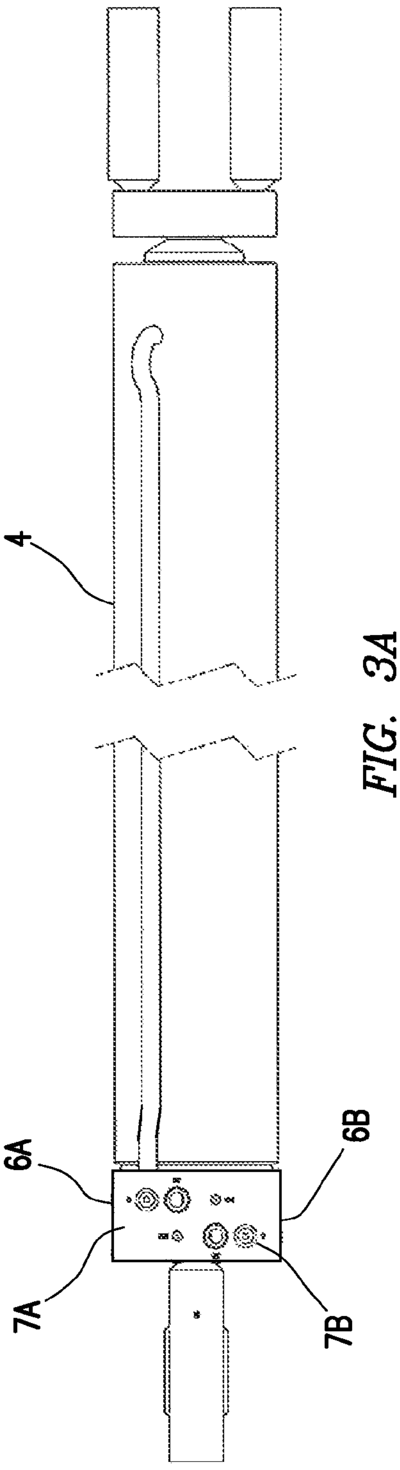
FIGS. 3A and 3B show the cylinders with the connections to counter balance valves and velocity fuses that control the flow of hydraulic fluid in and out of the cylinder.
Figure 3B:
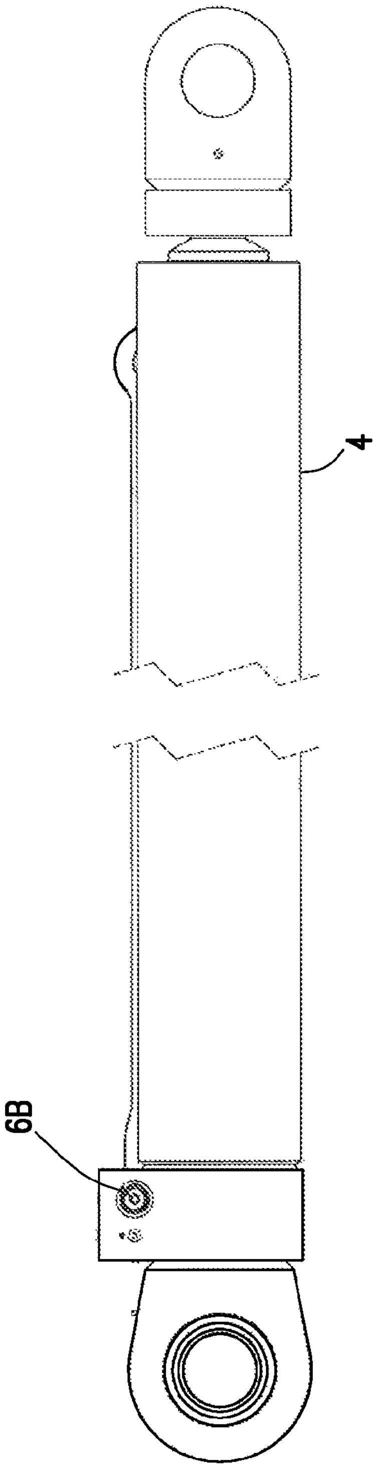

One embodiment of the hydraulic cylinders 4A, 4B used with the embodiments of the invention is shown in FIGS. 3A and 3B. The two hydraulic cylinders 4 each have counterbalance valves 6A and 6B connected to the rod end and base end respectively that ensure that in the case of a broken hydraulic fluid hose or a failure of the hydraulic power unit (HPU), pressure will be maintained in the hydraulic cylinders 4A, 4B and the raised catwalk 1 will not fall suddenly to the ground. The hydraulic cylinders 4A, 4B each also include velocity fuses 7A and 7B connected to the rod end and base end respectively. In the event that a hydraulic hose breaks while the safety valve package embodiment of the invention is being used, the velocity fuses 7A, 7B stop the flow of hydraulic fluid in the event that the flow of fluid exceeds about 4 gallons per minute so that the hydraulic cylinders 4A, 4B will lock in place rather than allowing the trough 2 to fall uncontrolled to the base of the catwalk 1.

Figure 4:
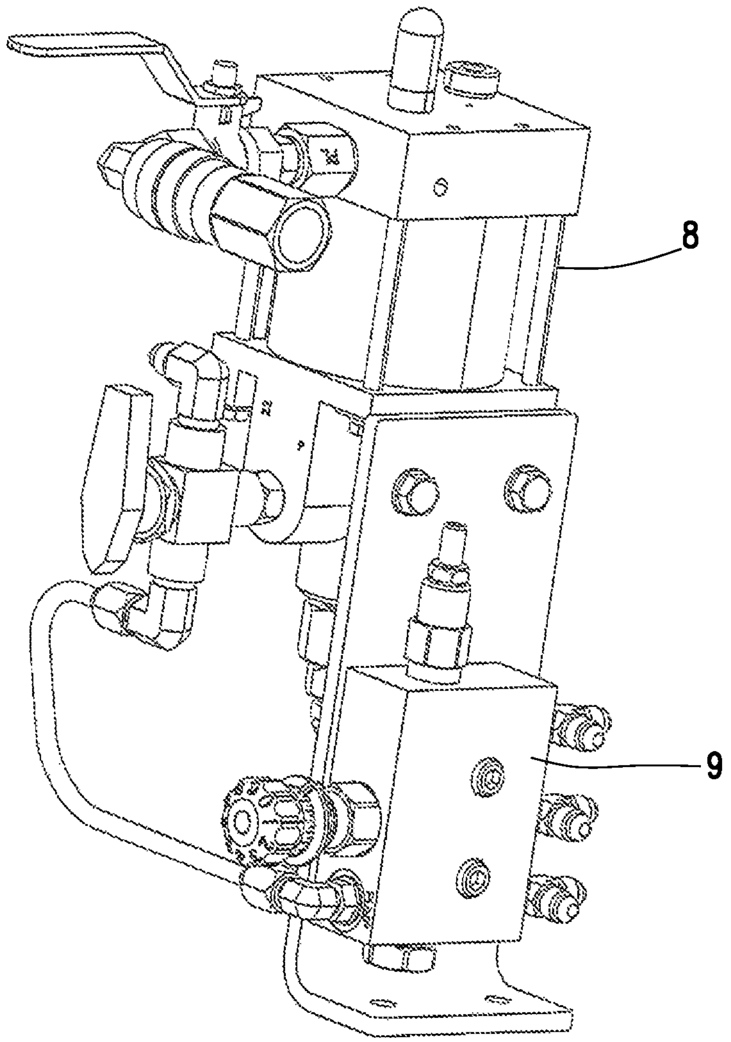
FIG. 4 shows an embodiment of the actuated pump and valve package.

FIG. 4 shows an embodiment of the actuated pump 8 and the safety valve package 9. Safety valve package 9 is shown in greater details in FIGS. 5A and 5B, discussed below.

Figure 5A:
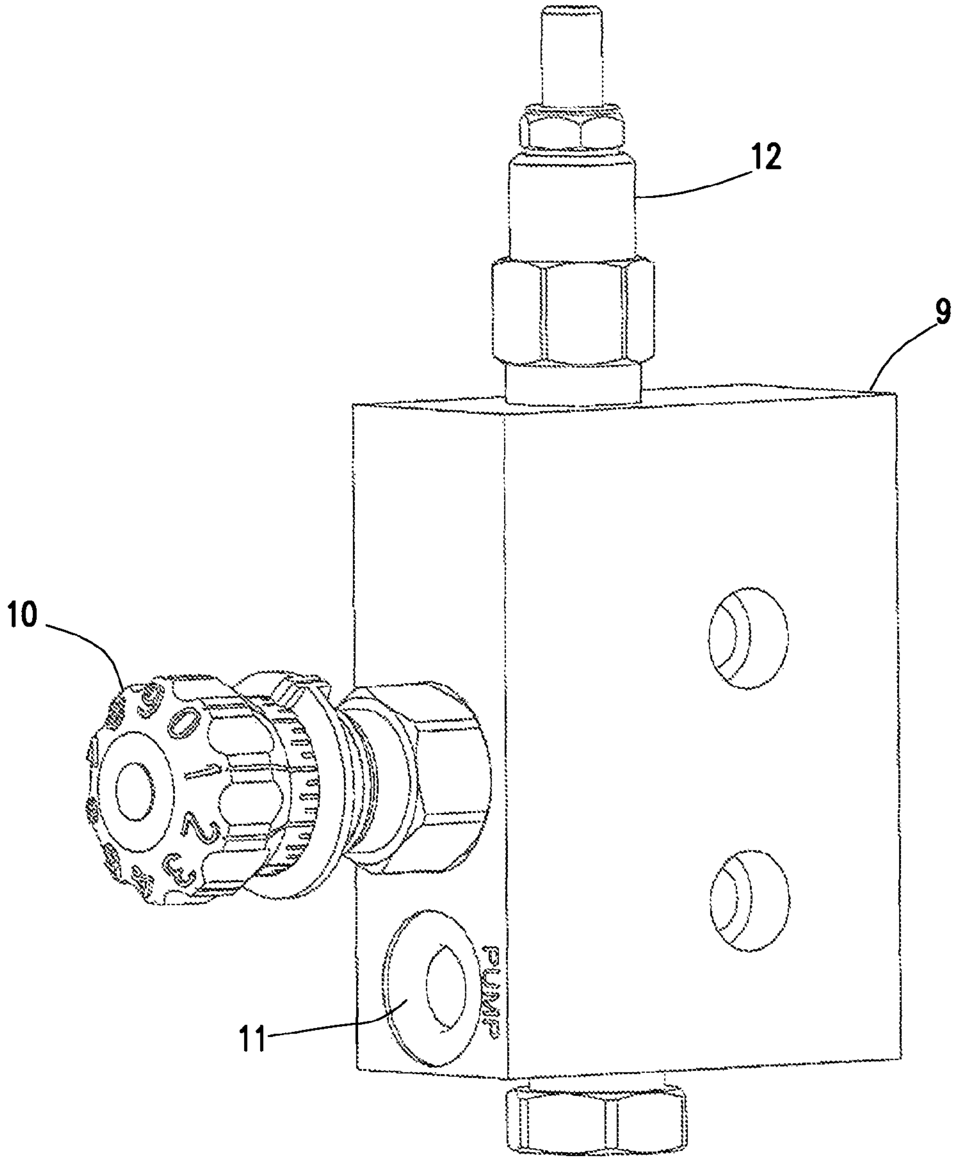
FIGS. 5A and 5B are external views of the safety valve package.
Figure 5B:
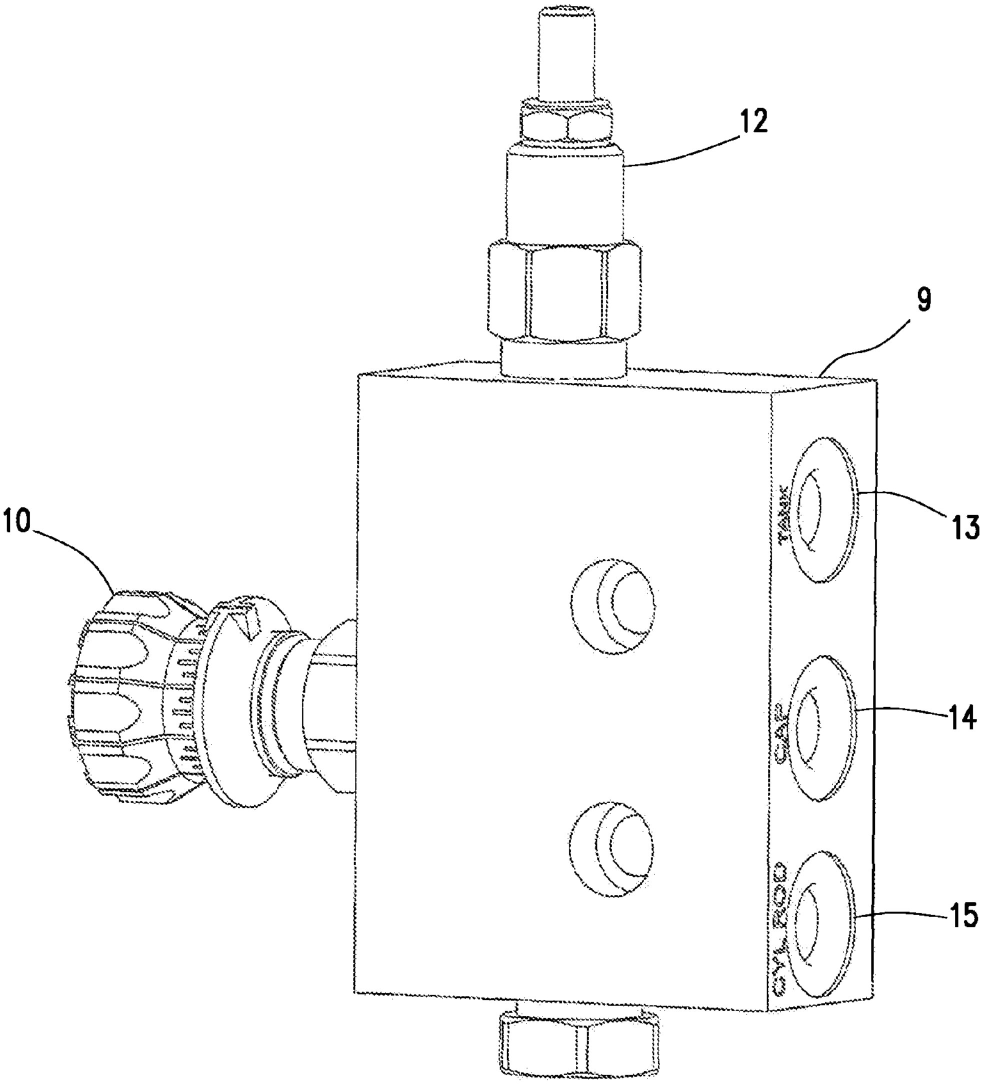

FIG. 5A shows an embodiment of the safety valve package 9. The safety valve package 9 allows the counterbalance valves 6A, 6B of the hydraulic cylinders 4A, 4B to be bypassed so that the raised catwalk 1 may be safely lowered to its home position as illustrated in FIG. 1A. FIG. 5A further shows a needle valve adjustment knob 10, a pump connection 11, and a portion of relief valve 12. FIG. 5B shows another angle of the safety valve package 9. The safety valve package 9 includes a connection 13 for the hydraulic fluid tank, a connection 14 for the base cap end of the hydraulic cylinders 4A, 4B, and a connection 15 for the rod end of the hydraulic cylinders 4A, 4B.

FIG. 6 shows the internal components of a housing of the safety valve package 9. Relief valve 12 maintains pressure within the circuit and allows for excess oil to be routed back to hydraulic fluid tank via connection 13. Needle valve 16 allows the user to slowly provide fluid via connection 14 from the base cap end of the hydraulic cylinders 4A, 4B to the rod end of the hydraulic cylinders 4A, 4B via connection 15 so that the rods may be retracted and the catwalk 1 may be lowered to its home position as illustrated in FIG. 1. Check valve 17 prevents back pressure from the pump via pump connection 11 from going to the base cap end of the hydraulic cylinders 4A, 4B via connection 14 and routes the pressure to the rod end via connection 15. The check valve 17 allows a manual or actuated pump attached to pump connection 11 to pump hydraulic fluid to the rod end of the hydraulic cylinders 4A, 4B via connection 15 in the event that the catwalk 1 is over center of the catwalk legs 5 and must be lowered to a point where gravity allows the catwalk 1 to be lowered to its home position in a controlled manner using the safety valve package 9. Once the weight of the hydraulic cylinders 4A, 4B becomes positive on the base end of the cylinders, oil is allowed by the relief valve 12 to pass from the base end of the cylinders to the rod end, with the excess oil going to the hydraulic fluid tank.

Figure 7:
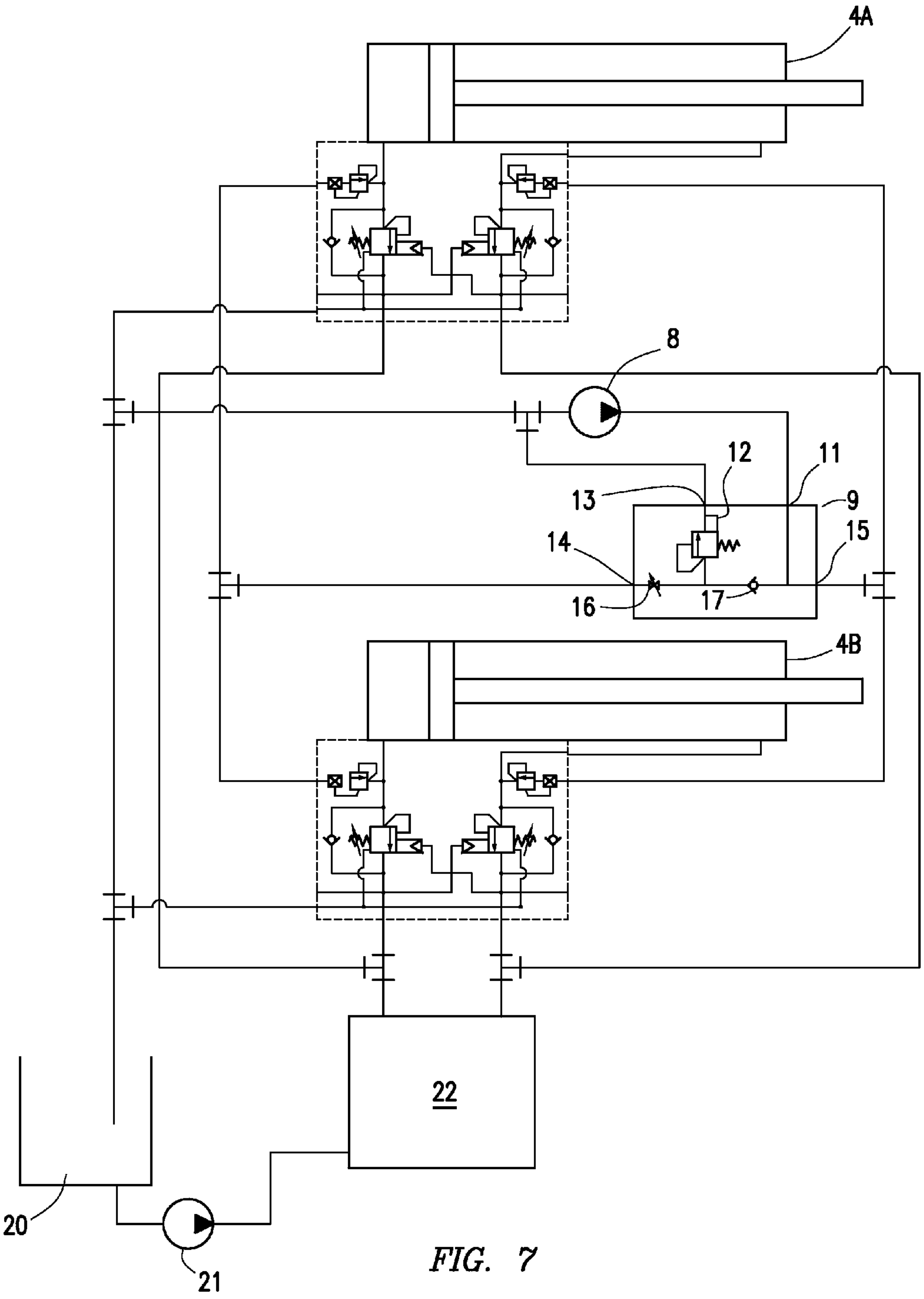
FIG. 7 is a schematic of the valve system of the hydraulic system for the hydraulic cylinders that raise and lower the trough.

FIG. 7 is a schematic showing the safety valve system and the safety valve package 9. Pump 8 connects to safety valve package 9 at pump connection 11. The base cap end of hydraulic cylinders 4A and 4B connect to safety valve package 9 at connection 14. The rod end of hydraulic cylinders 4A and 4B connect to safety valve package 9 at connection 15. Connection 13 is connected to hydraulic fluid tank 20, which supplies hydraulic fluid to the system through pump 21 and control valve 22. Relief valve 12, needle valve 16, and check valve 17 are used to operate safety valve package 9 as described above with reference to FIG. 6.

While the foregoing is directed to embodiments of the invention, other and further embodiments of the invention may be devised without departing from the basic scope thereof, and the scope thereof is determined by the claims that follow.

The invention claimed is:

1. A safety valve assembly for controlling hydraulic pressure in a hydraulic cylinder that is used to raise and lower a catwalk, comprising:

a relief valve coupled to a housing and configured to control fluid flow from the housing to a hydraulic tank;

a check valve coupled to the housing and configured to control fluid flow from a pump connection of the housing to a rod end connection of the housing; and a needle valve coupled to the housing and configured to control fluid flow from a cap end connection of the housing to the rod end connection.

2. The assembly of claim 1, further comprising a fluid connection of the housing that communicates fluid from the housing to the hydraulic tank.

3. The assembly of claim 1, wherein the pump connection communicates fluid flow from a pump into the housing.

4. The assembly of claim 1, wherein the rod end connection communicates fluid flow from the housing to a rod end of the hydraulic cylinder.

5. The assembly of claim 4, wherein the cap end connection communicates fluid flow from a cap end of the hydraulic cylinder to the housing.

6. The assembly of claim 5, wherein the needle valve is configured to adjust the fluid flow from the cap end connection to the rod end connection within the housing.

7. A safety valve system for controlling hydraulic pressure in a hydraulic cylinder that is used to raise and lower a catwalk, comprising:

the hydraulic cylinder;

the safety valve assembly of claim 1; and a pump configured to pump fluid into the housing via the pump connection.

8. The system of claim 7, further comprising a velocity fuse configured to close fluid flow from a cap end of the hydraulic cylinder into the housing via the cap end connection.

9. The system of claim 8, further comprising a counterbalance valve configured to maintain pressure in the hydraulic cylinder.

* * * * *